(12) United States Patent
Nichol

(10) Patent No.: US 10,179,702 B2
(45) Date of Patent: Jan. 15, 2019

(54) FEEDER FOR BULK SOLIDS

(71) Applicant: BATTELLE ENERGY ALLIANCE, LLC, Idaho Falls, ID (US)

(72) Inventor: Corrie Ian Nichol, Idaho Falls, ID (US)

(73) Assignee: BATTELLE ENERGY ALLIANCE, LLC, Idaho Falls, ID (US)

( * ) Notice: Subject to any disclaimer, the term of this patent is extended or adjusted under 35 U.S.C. 154(b) by 0 days.

(21) Appl. No.: 15/600,413

(22) Filed: May 19, 2017

(65) Prior Publication Data

US 2017/0334655 A1    Nov. 23, 2017

Related U.S. Application Data

(60) Provisional application No. 62/339,568, filed on May 20, 2016, provisional application No. 62/384,346, filed on Sep. 7, 2016.

(51) Int. Cl.
| | |
|---|---|
| *B65G 33/20* | (2006.01) |
| *B65G 33/08* | (2006.01) |
| *B65G 33/12* | (2006.01) |
| *B65G 33/10* | (2006.01) |
| *B65G 65/46* | (2006.01) |

(52) U.S. Cl.
CPC .............. *B65G 33/20* (2013.01); *B65G 33/08* (2013.01); *B65G 33/10* (2013.01); *B65G 33/12* (2013.01); *B65G 65/463* (2013.01)

(58) Field of Classification Search
CPC ........ B65G 33/08; B65G 33/10; B65G 33/12; B65G 33/20

USPC ......... 198/548, 550.1, 550.2, 658, 670, 671, 198/674; 222/412, 413, 504, 559
See application file for complete search history.

(56) References Cited

U.S. PATENT DOCUMENTS

| | | | | |
|---|---|---|---|---|
| 3,391,779 | A | | 7/1968 | Scheel |
| 3,496,601 | A | * | 2/1970 | McGill ............... B29C 47/1009 198/550.1 |
| 3,844,267 | A | | 10/1974 | Mohr |
| 3,872,691 | A | | 3/1975 | Hildebrandt |

(Continued)

FOREIGN PATENT DOCUMENTS

| | | |
|---|---|---|
| CN | 201367205 Y | 12/2009 |
| CN | 203927977 U | 11/2014 |

OTHER PUBLICATIONS

Maynard, Eric, "Ten Steps to an Effective Bin Design," CEP Magazine, Nov. 2013, pp. 25-32, American Institute of Chemical Engineers, New York City, New York, USA.

(Continued)

*Primary Examiner* — Leslie A Nicholson, III
(74) *Attorney, Agent, or Firm* — TraskBritt

(57) ABSTRACT

A feeder for bulk solids has a rotatable bin with an open bottom and an open top and is tilted so that one side of the bin is substantially vertical. A rotating auger is located within the bin having a vertically oriented exposed helical fin. Longitudinal ribs are secured on an inner surface of the bin and spaced radially. Material is loaded into the open top of the rotating bin, tumbling the material toward the bottom of the bin causing the material to constantly contact the rotating auger. The auger then feeds the material through the open bottom of the bin. Ribs engage the material in the bin enhancing tumbling and feeding.

17 Claims, 5 Drawing Sheets

(56) References Cited

U.S. PATENT DOCUMENTS

| | | | |
|---|---|---|---|
| 3,967,722 A | | 7/1976 | Dietert |
| 4,300,456 A | * | 11/1981 | Messersmith ............. F23K 3/00 |
| | | | 110/102 |
| 4,516,731 A | | 5/1985 | Prince et al. |
| 4,614,162 A | | 9/1986 | Ryan et al. |
| 4,796,747 A | * | 1/1989 | Kajiwara ................. A21C 3/04 |
| | | | 198/535 |
| 4,944,334 A | | 7/1990 | McGregor |
| 5,494,189 A | | 2/1996 | De Crane |
| 5,558,433 A | | 9/1996 | Gheorghita |
| 5,647,665 A | | 7/1997 | Schuler |
| 6,962,300 B2 | | 11/2005 | Zehr |
| 7,073,433 B2 | | 7/2006 | Burke et al. |
| 7,152,762 B2 | * | 12/2006 | Lang ..................... E04G 21/025 |
| | | | 222/185.1 |
| 7,189,306 B2 | | 3/2007 | Gervais |
| 8,083,090 B2 | | 12/2011 | Cocchiarella |
| 8,393,502 B2 | | 3/2013 | Renyer et al. |
| 8,651,408 B1 | | 2/2014 | Fox |
| 2007/0290008 A1 | * | 12/2007 | Becker ................... B65G 33/12 |
| | | | 222/412 |

OTHER PUBLICATIONS

Mehos, Greg, and Dave Morgan, "Hopper Design Principles," Chemical Engineering, Jan. 2016, pp. 58-63, Access Intelligence, New York City, New York, USA.

Messmer, Todd, "Choosing a Feeder: It's All About Your Material," Powder and Bulk Engineering, Dec. 2013, (no page numbers), CSC Publishing Inc., St. Paul, Minnesota, USA.

* cited by examiner

FEEDER FOR BULK SOLIDS

CROSS-REFERENCE TO RELATED APPLICATIONS

This application claims the benefit of U.S. Provisional Patent Application Ser. No. 62/384,346, filed Sep. 7, 2016, and U.S. Provisional Patent Application Ser. No. 62/339,568, filed May 20, 2016, the disclosures of each of which are hereby incorporated herein in their entirety by this reference.

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

TECHNICAL FIELD

The invention, in various embodiments, relates to a feeder for non-fluid materials. More specifically, embodiments of the invention relate to a feeder for feeding bulk solids into a subsequent process.

BACKGROUND

Bulk solids, such as biomass, are notoriously difficult to feed reliably. Auger feeder systems tend to form holes where material is removed in the vicinity of the auger but bridges above the hole, preventing feeding. Bin feeder systems tend to bridge at the outlet of the bin, preventing the material from feeding out of the bottom of the bin.

Current biomass analytical sample analysis equipment requires manual feeding of biomass into the mill, requiring a large amount of labor. Systems to automatically feed biomass samples are unable to handle a variety of biomass materials or to feed reliably.

The ability to reliably and consistently feed biomass material into a subsequent process is also a major problem with biomass processing, particularly where herbaceous biomass is to be used. Herbaceous biomass tends to be stringy and fluffy, resulting in difficulty in maintaining continuous feeding.

BRIEF SUMMARY

Embodiments described herein include feeders for bulk solids. In accordance with one embodiment described herein, a feeder tumbles bulk solids in a rotating bin, constantly bringing the bulk solids into contact with a movement enhancer located within the bin. In some embodiments, the bin may be a conical frustum shaped bin. The bin may alternatively be of a different shape such as a funnel shape, a cylindrical shape, a hyperboloid shape, or a combination of different shapes. In some embodiments, the movement enhancer may rotate. The movement enhancer may rotate in the same direction as the rotation of the bin, or may be counter rotated to the direction of the bin rotation. The bin may be oriented on an angle such that one side is substantially vertical and in close proximity to the movement enhancer. The tumbling action of the rotating bin causes the bulk solids to flow naturally toward the bottom of the bin into the proximity of the movement enhancer. The movement enhancer within the bin feeds the material through the open bottom of the bin to be used for a subsequent process. In some embodiments, the movement enhancer may be an auger. The auger may be an exposed (shaftless or centerless) auger (such as a ribbon auger) and may have a helical fin. In other embodiments the auger may have a shaft. The movement enhancer may also comprise a rod or shaft configured with paddles, blades, or similar objects.

Another embodiment of the invention further includes a plurality of longitudinal ribs on the inner surface of the bin extending for a least a portion of the length of the inner surface and spaced radially from one another. The ribs engage the bulk solids in the rotating bin and enhance its tumbling toward the movement enhancer.

Another embodiment of the invention further comprises a metering sleeve configured so that the movement enhancer is placed through the sleeve, and an actuator operatively connected to the sleeve. The actuator moves the sleeve along the movement enhancer to adjust the amount of bulk solids flowing through the movement enhancer and the open bin bottom.

Another embodiment of the invention further comprises a feeder gate configured beneath the open bin bottom, and an actuator operatively connected to the gate. The actuator moves the gate to slide the gate beneath the open bin bottom to cover a portion of the open bin bottom to adjust the amount of bulk solids flowing through the bin bottom.

DETAILED DESCRIPTION

Figure 1:
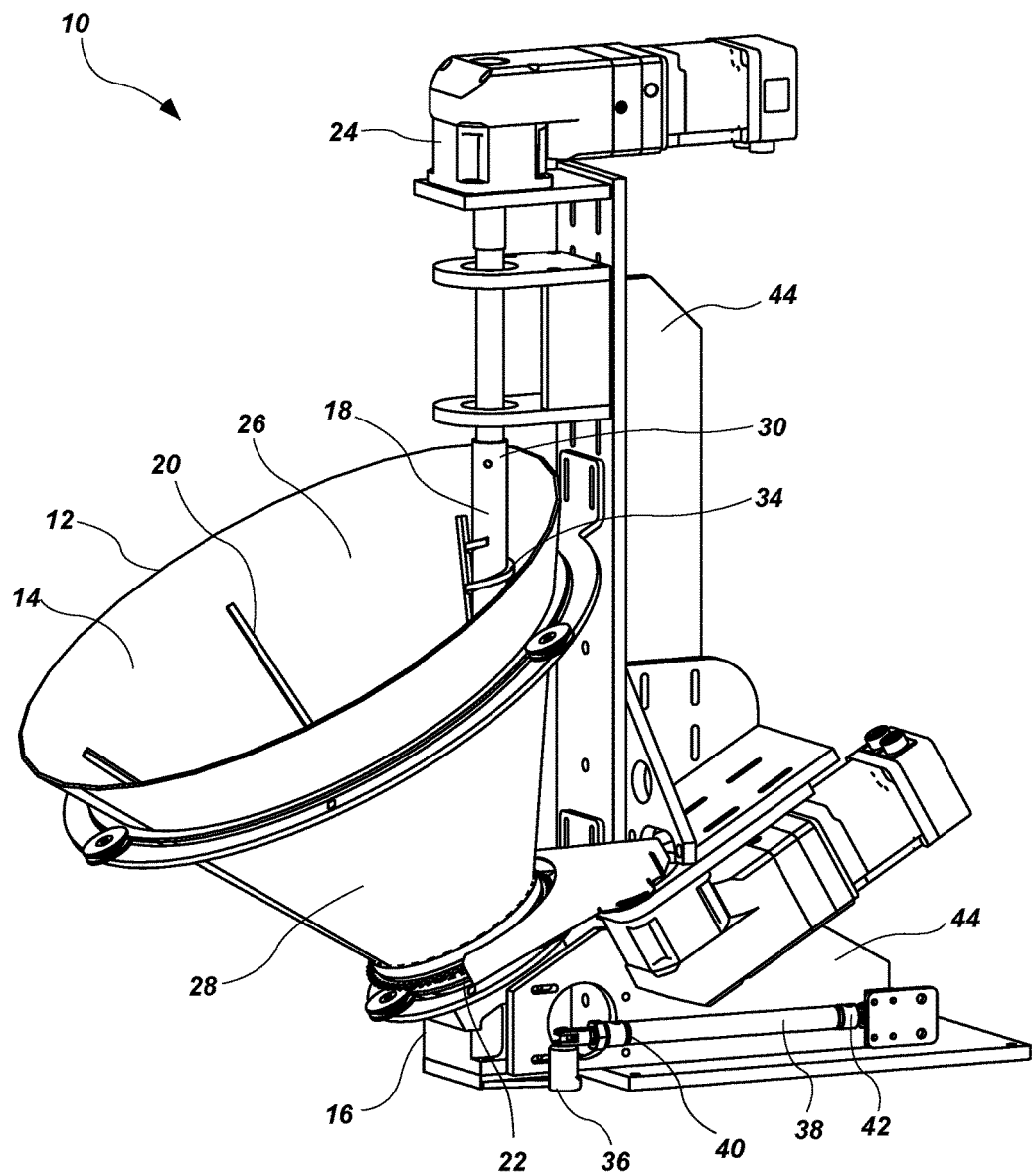
FIG. 1 is a perspective view of an embodiment of the invention.

This feeder design tumbles bulk solids in a rotating bin by constantly bringing the bulk solids into contact with a movement enhancer that is located within the bin. The bin may be oriented on an angle such that an inner surface of a side of the bin is substantially vertical and in close proximity to the movement enhancer. The tumbling action of the rotating bin causes the bulk solids to naturally flow to the bottom of the bin and into the proximity of the movement enhancer. The movement enhancer within the bin feeds the bulk solids through the opening at the bottom of the bin for the bulk solids to be used for a subsequent process. Ribs may be secured longitudinally and may be spaced radially on the inner surface of the bin to engage the bulk solids and enhance its tumbling.

As would be apparent to one skilled in the art, this feeder design can be used for many types of bulk solids. Bulk solids include free-flowing materials (such as plastic pellets), friable materials (such as dried pasta products), adhesive materials (such as color pigments), cohesive materials (such as powders), fibrous materials (such as biomass), aeratable materials (such as glass microspheres, flour, fly ash), hygroscopic materials (such as sugar, salt, cellulose fibers), and pressure-sensitive materials (such as wax beads). Bulk solids can also include abrasive materials; heterogeneous mixtures; materials that fluidize or liquefy; materials that pack, cake, smear or plug; and moist, sticky materials. Additional examples of bulk solids include pharmaceutical compositions, animal feed, raw foods, processed foods, vegetable tissues, animal tissues, powders, and granular materials.

The following description provides specific details to provide a thorough description of embodiments of the invention. However, a person of ordinary skill in the art will understand that the embodiments of the invention may be practiced without using these specific details. Indeed, the embodiments of the invention may be practiced in conjunction with conventional systems and methods used in the industry. In addition, only those components and acts necessary to understand the embodiments of the invention are described in detail. A person of ordinary skill in the art will understand that some components may not be described herein but that using various conventional components and acts would be in accord with the disclosure. Any drawings accompanying the present application are for illustrative purposes only and are not necessarily drawn to scale. Elements common among figures may retain the same numerical designation.

As used herein, the term "configured" refers to a size, shape, material composition, and arrangement of one or more of at least one structure and at least one apparatus facilitating operation of one or more of the structure and the apparatus in a predetermined way.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

As used herein, the term "driver" means and includes a motor, chain, belt, shaft, etc.

As used herein, the term "movement enhancer" means a mechanism for allowing continuous flow of bulk solids within the bin, such as by preventing bridging or arching, and may include, a sweep, an auger, a bladed rod, a bit, a pulsing shaft, a rod with paddles, and the like.

Figure 2:
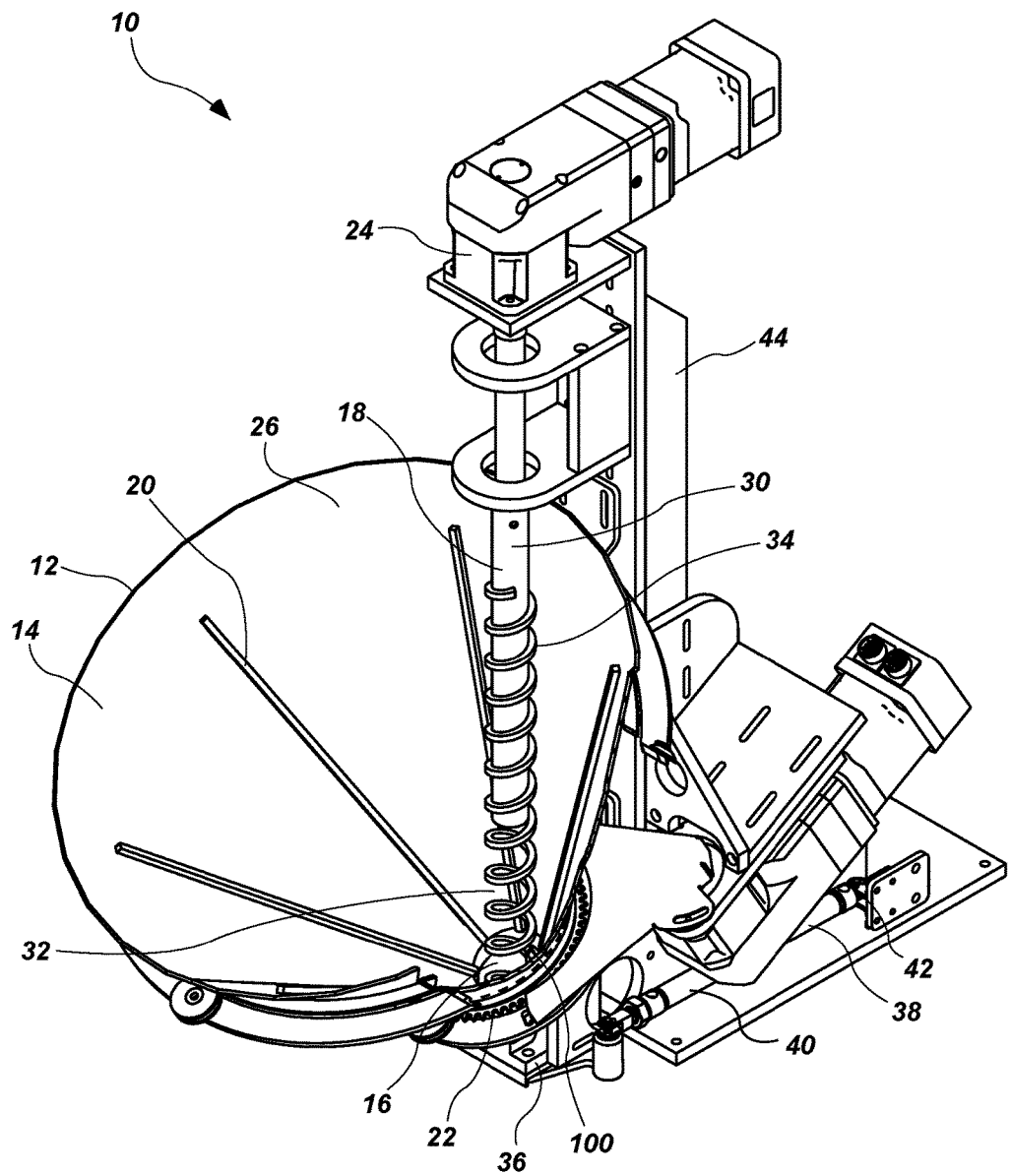
FIG. 2 is an alternative perspective view of the embodiment of FIG. 1 with a cutaway exposing the inside of the bin.
Figure 3:
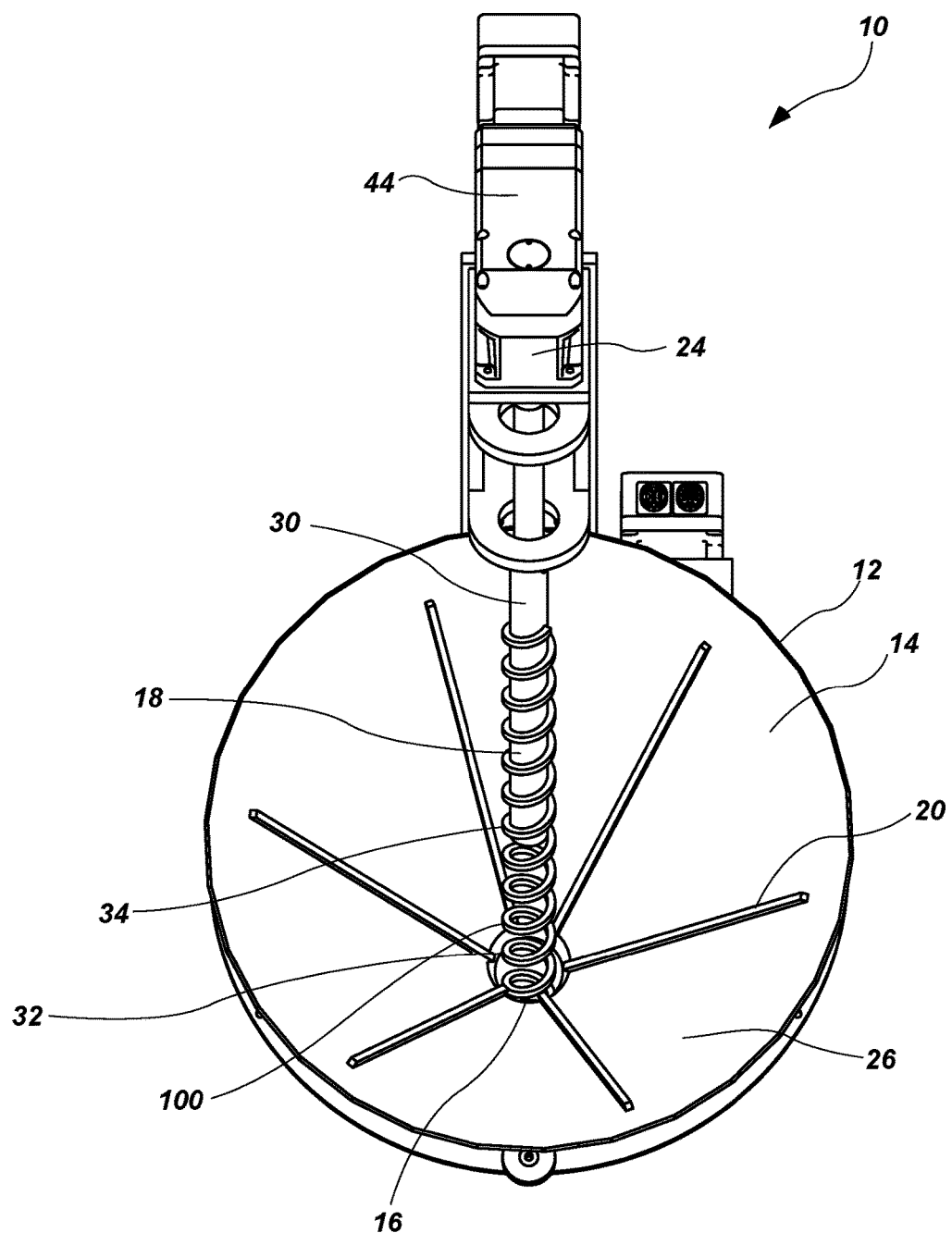
FIG. 3 is a top view of the embodiment of FIG. 1.

FIGS. 1, 2, and 3 show a perspective view, an alternative perspective view with a cutaway, and a top view, respectively, of an embodiment of the present invention of a feeder for bulk solids. Referring to the illustrative embodiment in FIGS. 1, 2, and 3, the feeder, indicated generally by numeral 10, includes a bin 12 having an open top 14 and an open bottom 16 (shown in FIGS. 2 and 3). The bin 12 may be fabricated from aluminum or other materials, without limitation, such as stainless steel or plastic. The bin 12 is tilted so that a side of the bin is substantially vertical. The diameter of the top 14 and/or bottom 16 of the bin 12 may be modified to change the slope of the inner surface 26 and outer surface 28 (shown in FIG. 1) of the bin for the type of bulk solids being used. In this illustrative embodiment, a conical frustum shaped bin 12 is shown. However, the bin 12 may be of a different shape (for example, a funnel shape, a cylindrical shape, a hyperboloid shape, or a combination of different shapes).

The movement enhancer shown is an auger 18. However, the movement enhancer may comprise a rod or shaft configured with objects such as paddles, blades, etc., for feeding the material through the open bottom 16. The auger 18, with a top end 30 and a bottom end 32 (not shown in FIG. 1), is placed within the bin 12. The bottom end of the auger 32 (not shown in FIG. 1) is aligned substantially centered above the open bottom 16 (shown in FIGS. 2 and 3) of the bin 12. The auger 18 is oriented substantially vertically and in close proximity to the substantially vertical side of the tilted bin 12. As shown in FIGS. 2 and 3, the auger 100 may be an exposed (shaftless or centerless) auger (for example, a ribbon auger) with a helical fin 34, which allows bulk solids to pass through the center of the auger itself. In other embodiments, the auger may have a shaft.

A driver 22 is operatively connected to the bin 12 for rotating the bin, and a driver 24 is operatively connected to the auger 18 for rotating the auger. The bin 12 is configured to receive bulk solids into the open top 14, and the bin 12 is configured to rotate in a first direction. The auger 18 may be configured to be rotated in the same first direction or the auger 18 may be configured to be counter-rotated in a second direction, with the rotating bin 12 and the rotating auger 18 tumbling the material and pushing the bulk solids through the open bottom 16 (shown in FIGS. 2 and 3). In some embodiments, the auger 18 or other movement enhancer may be configured to not rotate. An open top 14 may facilitate placement of bulk solids in the bin 12, but in other embodiments having the bin covered or partially covered such as by an automatic feeder or lid may be used.

At least one longitudinal rib 20 may be secured on the inner surface 26 of the bin 12 to engage the bulk solids and enhance its tumbling toward the auger 18 and bottom of the bin 12. The illustrative embodiment as shown in FIG. 3 has six longitudinal ribs 20 oriented radially and equally spaced on the inner surface 26 of the bin 12. The ribs 20 may extend for at least a portion of the length of the inner surface and may be spaced radially from one another. The ribs 20 may be fabricated from aluminum or other materials, without limitation, such as stainless steel or plastic. The ribs 20 may be fabricated as an integral part of the bin 12, or may be added later through welding, gluing, rivets, screws, etc. The longitudinal ribs 20 of the feeder design may be modified for the type of bulk solids being used. For example, the number, length, width, spacing, or shape (for example, straight, curved) of the ribs may be modified. The feeder design may also exclude the ribs.

With continued reference to the illustrative embodiment in FIGS. 1, 2, and 3, a support or vertical frame 44 may be used to support the bin 12 and auger 18. In other embodiments, other types of support suitable for the operation of the feeder may be used, such as a horizontal support or a wall.

Figure 4:
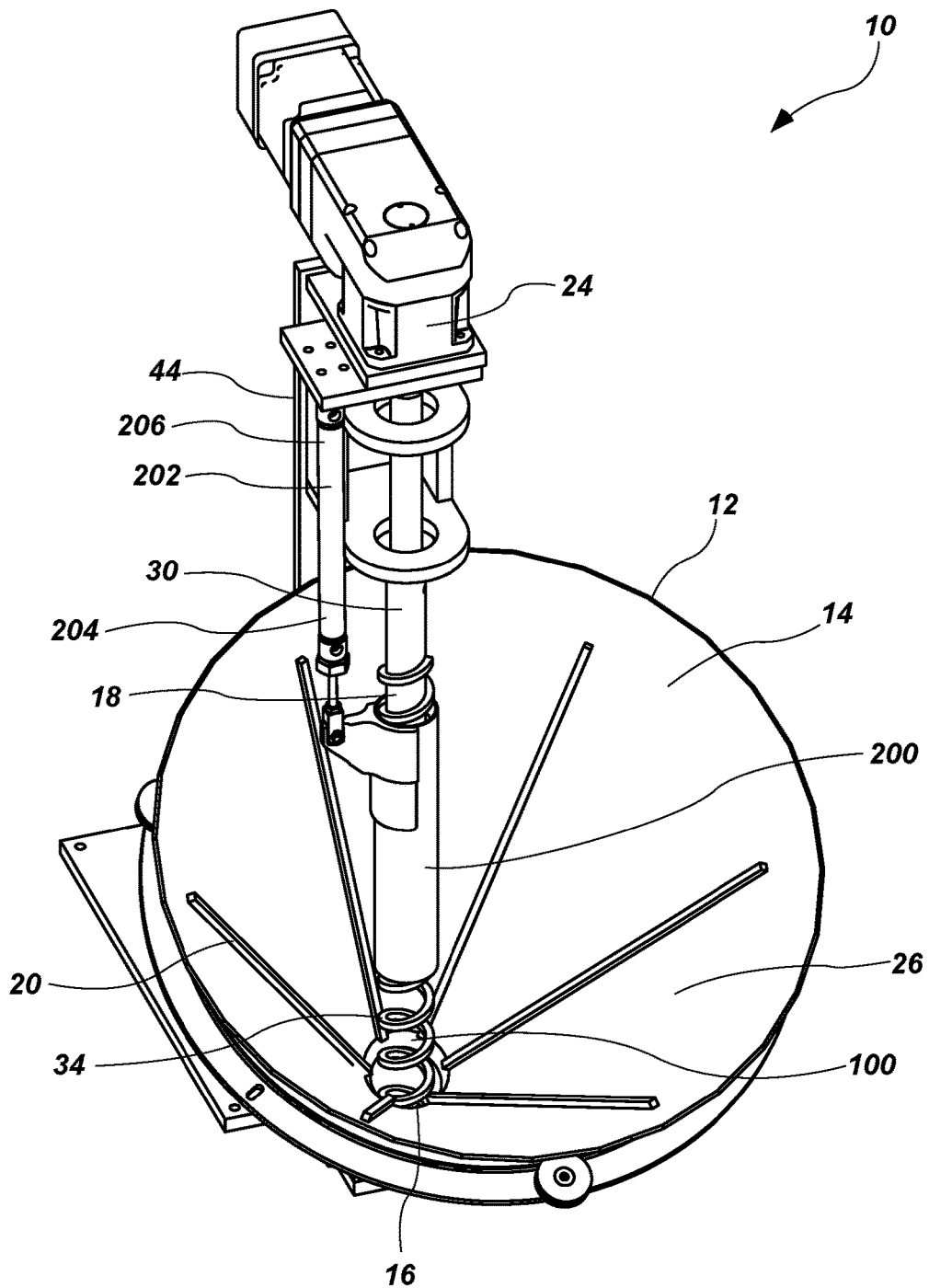
FIG. 4 is a top view of an alternative embodiment of the invention showing a flow metering sleeve over the auger.

Referring to the illustrative embodiment in FIG. 4, a metering sleeve 200 may be configured so that the exposed auger 100 is placed through the sleeve 200, and an actuator 202 may be operatively connected to the sleeve 200. With a first end 204 of the actuator 202 connected to the sleeve 200 and a second end 206 of the actuator 202 connected to the support 44, the actuator 202 moves the sleeve 200 along the exposed auger 100 to adjust the amount of bulk solids flowing through the exposed auger and the open bin bottom 16. As illustrated in FIG. 4, the sleeve 200 may be slidably connected to the actuator 202 to allow the sleeve 200 to cover all or a portion or none of the exposed auger 100. The actuator 202 may be a pneumatic linear actuator or other types of actuators, such as an electronic linear actuator. As shown in FIG. 4, the sleeve 200 may be cylindrically shaped, have a diameter slightly larger than the diameter of the auger 100, and a length about half the length of the auger 100. In other embodiments, the sleeve may be of a different shape, have a diameter significantly greater than the diameter of the auger 100, and a length greater than or less than about half the length of the auger 100. The sleeve 200 may be fabricated from aluminum or other materials, without limitation, such as stainless steel or plastic.

Figure 5:
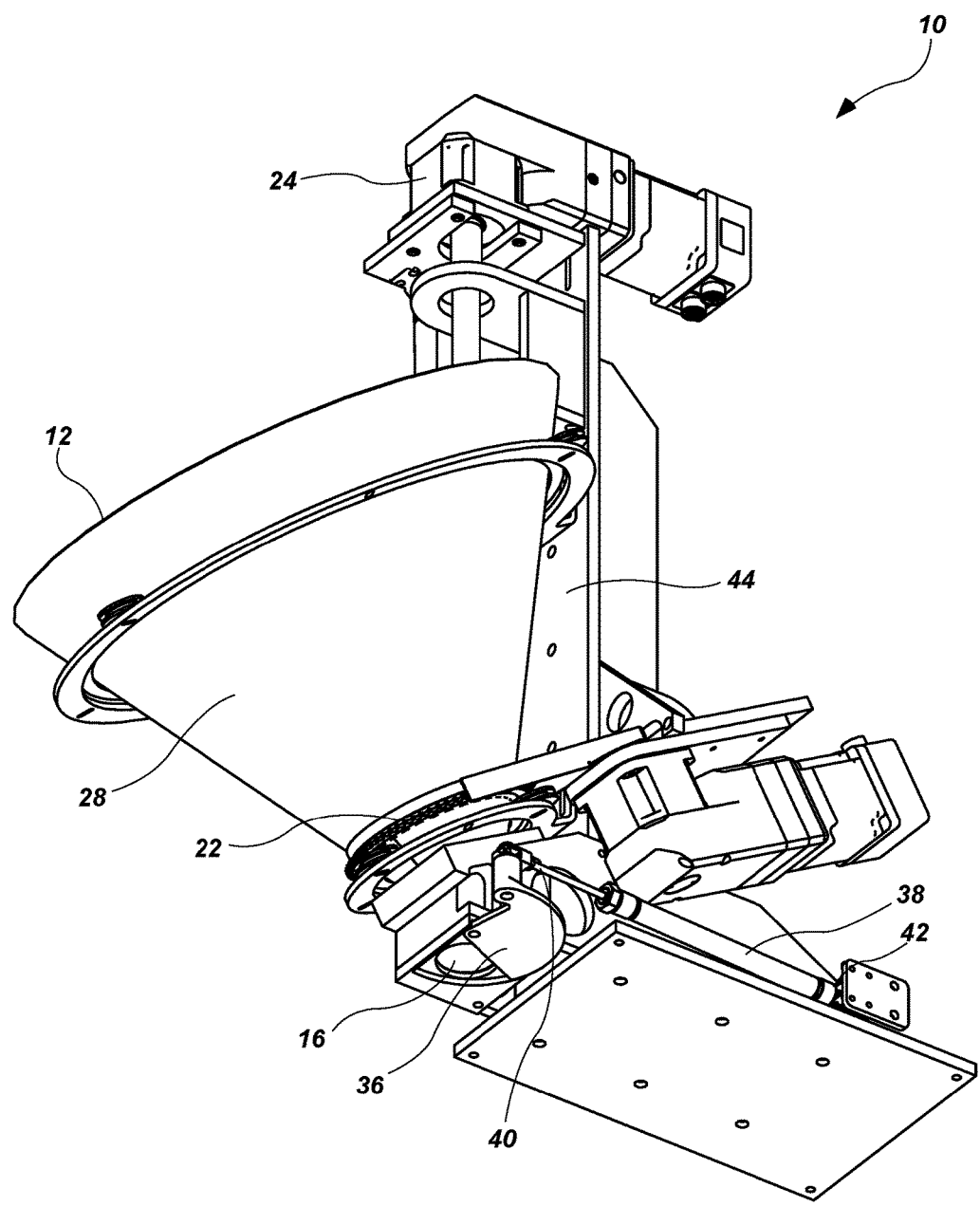
FIG. 5 is a bottom view of the embodiment of FIG. 1 showing the feeder gate.

Referring to the illustrative embodiment in FIGS. 1, 2, and 5, a feeder gate 36 may be configured beneath the open bin bottom 16 with an actuator 38 operatively connected to the gate 36. With a first end 40 of the actuator 38 connected to the feeder gate 36 and a second end 42 of the actuator 38 connected to a support 44, the gate can be moved to cover all or a portion of the open bin bottom 16 to adjust the amount of bulk solids flowing through the bin bottom. As illustrated in FIG. 5, the gate 36 may be pivotally connected to the actuator 38 to allow the gate 36 to cover all or a portion or none of the open bin bottom 16. The actuator 38 may be a pneumatic linear actuator or other types of actuators, such as an electronic linear actuator. The gate 36 may be shaped and sized to cover the entire opening of the open bin bottom 16, or the gate 36 may be shaped and sized to be the same size as or smaller than the opening of the open bin bottom 16. The gate 36 may be fabricated from aluminum or other materials, without limitation, such as stainless steel or plastic. In other embodiments, the gate 36 may be operatively connected in other manners, such as slidably connected or hingedly connected.

This feeder design may be scaled for different types of bulk solids. For example, the feeder design may be scaled for use such as on a biomass analytical sample grinding unit, which enables automated grinding of biomass analytical samples. This feeder may be scaled up to feed larger biomass processing operations, such as cellulosic ethanol production, or pellet production. This feeder may also be used in a liquid/solids separation mode whereby solid materials would be tumbled to the bottom of the bin, while liquid materials (such as water) would flow out of the top of the bin.

The invention claimed is:

1. A feeder for bulk solids comprising:
a rotatable bin for receiving the bulk solids, the bin having an inner surface, an outer surface, an open bottom, and an open top;
a movement enhancer placed within the rotatable bin, the movement enhancer having a top end and a bottom end, the bottom end of the movement enhancer being aligned substantially centered above the open bottom of the rotatable bin;
a metering sleeve, the movement enhancer configured to be placed through the metering sleeve.

2. The feeder for bulk solids of claim 1, further comprising an actuator with a first end and a second end, wherein the first end is operatively connected to the metering sleeve and the second end is operatively connected to a support.

3. A feeder for bulk solids comprising:
a rotatable bin for receiving the bulk solids, the bin having an inner surface, an outer surface, an open bottom, and an open top;
a movement enhancer placed within the rotatable bin, the movement enhancer having a top end and a bottom end, the bottom end of the movement enhancer being aligned substantially centered above the open bottom of the rotatable bin;
a driver operatively connected to the movement enhancer for rotating the movement enhancer; and
another driver operatively connected to the rotatable bin for rotating the rotatable bin.

4. The feeder for bulk solids of claim 3, wherein the rotatable bin is rotatable in a first direction and the movement enhancer is counter-rotatable in a second direction.

5. The feeder for bulk solids of claim 3, wherein the movement enhancer is rotatable in the same direction as the rotatable bin.

6. A feeder for bulk solids comprising:
a rotatable bin for receiving the bulk solids, the bin having an inner surface, an outer surface, an open bottom, and an open top, the bin being tilted so that the inner surface of a side of the bin is substantially vertical;
an auger placed within the rotatable bin, the auger having a top end and a bottom end, the bottom end being aligned substantially centered above the open bottom of the rotatable bin;
a driver operatively connected to the bin for rotating the bin;
another driver operatively connected to the auger for rotating the auger; and
a plurality of longitudinal ribs on the inner surface of the rotatable bin extending for at least a portion of the length of the inner surface.

7. The feeder for bulk solids of claim 6, wherein the auger does not have a shaft.

8. The feeder for bulk solids of claim 6, wherein the auger has a helical fin.

9. The feeder for bulk solids of claim 6, wherein the longitudinal ribs are spaced radially from one another.

10. The feeder for bulk solids of claim 6, further comprising a metering sleeve, wherein the auger is placed through the metering sleeve.

11. The feeder for bulk solids of claim 10, further comprising an actuator with a first end and a second end, wherein the first end is operatively connected to the metering sleeve and the second end is operatively connected to a support.

12. The feeder for bulk solids of claim 6, further comprising a feeder gate.

13. The feeder for bulk solids of claim 12, further comprising an actuator with a first end and a second end, wherein the first end is operatively connected to the feeder gate and the second end is operatively connected to a support.

14. The feeder for bulk solids of claim 6, wherein the rotatable bin is a conical frustum shaped bin.

15. The feeder for bulk solids of claim 6, wherein the rotatable bin is rotatable in a first direction and the auger is counter-rotatable in a second direction.

16. The feeder for bulk solids of claim 6, wherein the auger is rotatable in the same direction as the rotatable bin.

17. A feeder for bulk solids comprising:
a rotatable conical frustum shaped bin for receiving the bulk solids, the rotatable conical frustum shaped bin having an inner surface, an outer surface, an open bottom of a first diameter, and an open top of a second diameter greater than the first diameter, the rotatable conical frustum shaped bin being tilted so that the inner surface of a side of the rotatable conical frustum shaped bin is substantially vertical;
an auger placed within the bin substantially parallel to a side of the inner surface of the rotatable conical frustum shaped bin, the auger having a top end, a bottom end, no shaft, and a helical fin, the bottom end being aligned substantially centered above the open bottom of the rotatable conical frustum shaped bin;

a driver operatively connected to the rotatable conical frustum shaped bin for rotating the rotatable conical frustum shaped bin in a first direction;
another driver operatively connected to the auger for counter-rotating the auger in a second direction; and
a plurality of longitudinal ribs on the inner surface of the rotatable conical frustum shaped bin extending for at least a portion of the length of the inner surface and spaced radially from one another.

* * * * *